US012798565B2

(12) United States Patent
Sasahara et al.

(10) Patent No.: US 12,798,565 B2
(45) Date of Patent: Nov. 17, 2026

(54) DRIVING ASSISTANCE APPARATUS, DRIVING ASSISTANCE METHOD, AND NON-TRANSITORY STORAGE MEDIUM

(71) Applicant: ISUZU MOTORS LIMITED, Yokohama (JP)

(72) Inventors: Tomoya Sasahara, Fujisawa (JP); Noriyuki Tsukada, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 87 days.

(21) Appl. No.: 18/887,389

(22) Filed: Sep. 17, 2024

(65) Prior Publication Data

US 2025/0121820 A1 Apr. 17, 2025

(30) Foreign Application Priority Data

Oct. 13, 2023 (JP) ................................ 2023-177586

(51) Int. Cl.

| | |
|---|---|
| ***B60W 30/09*** | (2012.01) |
| ***B60Q 5/00*** | (2006.01) |
| ***B60W 10/18*** | (2012.01) |
| ***B60W 30/095*** | (2012.01) |
| ***B60W 30/16*** | (2020.01) |
| ***B60W 30/18*** | (2012.01) |

(52) U.S. Cl.

CPC ............ *B60W 30/09* (2013.01); *B60Q 5/006* (2013.01); *B60W 10/18* (2013.01); *B60W 30/0956* (2013.01); *B60W 30/16* (2013.01); *B60W 30/18036* (2013.01); *B60W 2520/10* (2013.01); *B60W 2554/4029* (2020.02); *B60W 2554/4042* (2020.02); *B60W 2554/80* (2020.02)

(58) Field of Classification Search

CPC .. B60W 30/09; B60W 10/18; B60W 30/0956; B60W 30/16; B60W 30/18036; B60W 2520/10; B60W 2554/4029; B60W 2554/4042; B60W 2554/80; B60W 2554/402; B60W 30/0953; B60Q 5/006

See application file for complete search history.

(56) References Cited

U.S. PATENT DOCUMENTS

2014/0028451 A1* 1/2014 Takahashi ............. B60Q 1/503 340/463
2016/0291149 A1 10/2016 Zeng et al.

(Continued)

FOREIGN PATENT DOCUMENTS

CN 116279118 A 6/2023
JP H0926826 A 1/1997

(Continued)

*Primary Examiner* — Russell Frejd
*Assistant Examiner* — Ana D Thomas
(74) *Attorney, Agent, or Firm* — Shih IP Law Group, PLLC

(57) ABSTRACT

The driving assistance apparatus includes a zone identification part that identifies an entry zone that a moving object from among a plurality of zones set along an estimated path of the reversing vehicle, and an avoidance control part that causes the reversing vehicle to execute avoidance control of a risk rank corresponding to the entry zone on the basis of control information in which i) a risk rank indicating a degree of risk of a collision between a reversing vehicle and a moving object and ii) an avoidance control enabling avoidance of a collision between the reversing vehicle and the moving object.

11 Claims, 6 Drawing Sheets

(56) References Cited

U.S. PATENT DOCUMENTS

| | | | | |
|---|---|---|---|---|
| 2017/0203757 | A1 | 7/2017 | Ohbayashi | |
| 2019/0135278 | A1* | 5/2019 | Hillman | B60W 30/09 |
| 2020/0331469 | A1* | 10/2020 | Nagata | B60W 30/0956 |

FOREIGN PATENT DOCUMENTS

| | | | |
|---|---|---|---|
| JP | 2016194481 | A | 11/2016 |
| JP | 2017-128213 | A | 7/2017 |
| JP | 2021028266 | A | 2/2021 |
| JP | 2022133832 | A | 9/2022 |
| JP | 2023000507 | A | 1/2023 |

* cited by examiner

| | SPEED RANK 1 (V＞15km/h) | SPEED RANK 2 (15km/h≧V＞10km/h) | SPEED RANK 3 (V≦10km/h) |
|---|---|---|---|
| FIRST ZONE 12A | A-1 | A-2 | A-3 |
| SECOND ZONE 12B | B-1 | B-2 | B-3 |
| THIRD ZONE 12C | C-1 | C-2 | C-3 |

FIG. 3

| TIME UNTIL COLLISION [s] | TTC LEVEL |
|---|---|
| 0.0 ≦ TIME UNTIL COLLISION < 0.3 | Level 1 |
| 0.3 ≦ TIME UNTIL COLLISION < 0.5 | Level 2 |
| 0.5 ≦ TIME UNTIL COLLISION < 1.0 | Level 3 |
| 1.0 ≦ TIME UNTIL COLLISION < 1.5 | Level 4 |
| 1.5 ≦ TIME UNTIL COLLISION | Level 5 |

FIG. 4

| | | TTC LEVEL | | | | |
|---|---|---|---|---|---|---|
| | | Level 1 | Level 2 | Level 3 | Level 4 | Level 5 |
| RISK RANK | A-1 | BRAKING CONTROL (3) | BRAKING CONTROL (3) | BRAKING CONTROL (3) | BRAKING(3)(pedestrian) WARNING(2)(vehicle) | ALERT CONTROL (1) |
| | A-2 | BRAKING CONTROL (3) | BRAKING CONTROL (3) | BRAKING CONTROL (3) | WARNING CONTROL (2) | ALERT CONTROL (1) |
| | A-3 | BRAKING CONTROL (3) | BRAKING CONTROL (3) | BRAKING(3)(pedestrian) WARNING(2)(vehicle) | WARNING(2)(pedestrian) ALERT(1)(vehicle) | ALERT CONTROL (1) |
| | B-1 | BRAKING CONTROL (3) | BRAKING CONTROL (3) | WARNING CONTROL (2) | WARNING(2)(pedestrian) ALERT(1)(vehicle) | ALERT(1)(pedestrian) N/A(vehicle) |
| | B-2 | BRAKING CONTROL (3) | BRAKING(3)(pedestrian) WARNING(2)(vehicle) | WARNING CONTROL (2) | ALERT CONTROL (1) | N/A |
| | B-3 | BRAKING(3)(pedestrian) WARNING(2)(vehicle) | WARNING CONTROL (2) | WARNING CONTROL (2) | ALERT CONTROL (1) | N/A |
| | C-1 | WARNING CONTROL (2) | WARNING CONTROL (2) | WARNING(2)(pedestrian) ALERT(1)(vehicle) | ALERT(1)(pedestrian) N/A(vehicle) | N/A |
| | C-2 | WARNING(2)(pedestrian) ALERT(1)(vehicle) | WARNING(2)(pedestrian) ALERT(1)(vehicle) | ALERT CONTROL (1) | N/A | N/A |
| | C-3 | ALERT CONTROL (1) | ALERT CONTROL (1) | ALERT CONTROL (1) | N/A | N/A |

FIG. 5

DRIVING ASSISTANCE APPARATUS, DRIVING ASSISTANCE METHOD, AND NON-TRANSITORY STORAGE MEDIUM

CROSS-REFERENCE TO RELATED APPLICATIONS

The present application claims priority to Japanese Patent Applications number 2023-177586, filed on Oct. 13, 2023, contents of which are incorporated herein by reference in their entirety.

BACKGROUND OF THE INVENTION

The present disclosure relates to a driving assistance apparatus, a driving assistance method, and a non-transitory storage medium for assisting driving of a vehicle. A technique for avoiding a collision between a reversing vehicle and a moving object approaching the vehicle is known. Japanese Unexamined Patent Application Publication No. 2017-128213 discloses a technique of activating an automatic brake of a vehicle if an estimated path of a reversing vehicle intersects with an estimated path of a moving object.

However, even if a reversing vehicle and a moving object approaching the reversing vehicle are sufficiently separated, allowing a collision to be avoided through turning or the like, the technique of Patent Document 1 sometimes activates an automatic brake to avoid a collision between the reversing vehicle and the moving object if an estimated path of the reversing vehicle and an estimated path of the moving object intersect with each other.

BRIEF SUMMARY OF THE INVENTION

The present disclosure focuses on this point, and an object thereof is to execute appropriate avoidance control when avoiding a collision between a reversing vehicle and a moving object.

Means for Solving the Problems

A first aspect of the present disclosure provides a driving assistance apparatus including a storage that stores control information in which i) each of a plurality of risk ranks indicating a risk of a collision between a reversing vehicle that is reversing and a moving object and ii) avoidance control enabling avoidance of a collision between the reversing vehicle and the moving object are associated with each other, a zone identification part that identifies an entry zone that a moving object present around the reversing vehicle enters from among a plurality of zones set along an estimated path of the reversing vehicle, and an avoidance control part that causes the reversing vehicle to execute avoidance control associated with a risk rank corresponding to the identified entry zone, on the basis of the control information.

A second aspect of the present disclosure provides a driving assistance method executed by a processor mounted on a reversing vehicle that is reversing, the method including the steps of identifying an entry zone that a moving object enters from among a plurality of zones set along an estimated path of the reversing vehicle, and causing the reversing vehicle to execute avoidance control associated with a risk rank corresponding to the identified entry zone, on the basis of control information in which i) each of a plurality of risk ranks indicating a risk of a collision between the reversing vehicle and a moving object and ii) avoidance control enabling avoidance of a collision between the reversing vehicle and the moving object are associated with each other.

A third aspect of the present disclosure provides a non-transitory storage medium storing a program for causing a processor mounted on a reversing vehicle that is reversing to function as an identification part that identifies an entry zone that a moving object enters from among a plurality of zones set along an estimated path of the reversing vehicle, and an avoidance control part that causes the reversing vehicle to execute avoidance control associated with a risk rank corresponding to the identified entry zone, on the basis of control information in which i) each of a plurality of risk ranks indicating a risk of a collision between the reversing vehicle and a moving object and ii) avoidance control enabling avoidance of a collision between the reversing vehicle and the moving object are associated with each other.

BRIEF DESCRIPTION OF THE DRAWINGS

FIG. 3 is a data table showing an example of rank assignment information.

FIG. 4 is a data table showing an example of level assignment information.

FIG. 5 is a data table showing an example of control information.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

Configuration of Driving Assistance Apparatus 6

Figure 1:
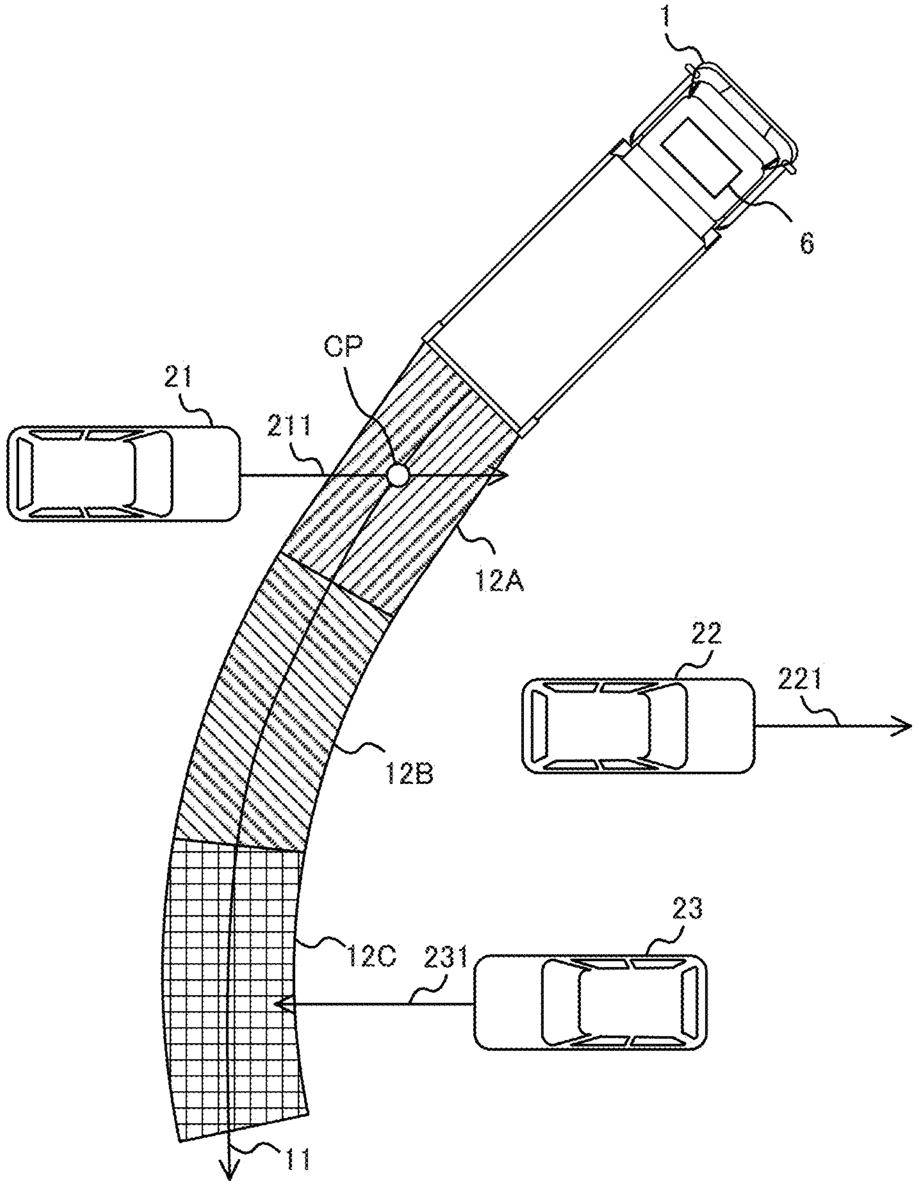
FIG. 1 illustrates an overview of a driving assistance apparatus.
Figure 2:
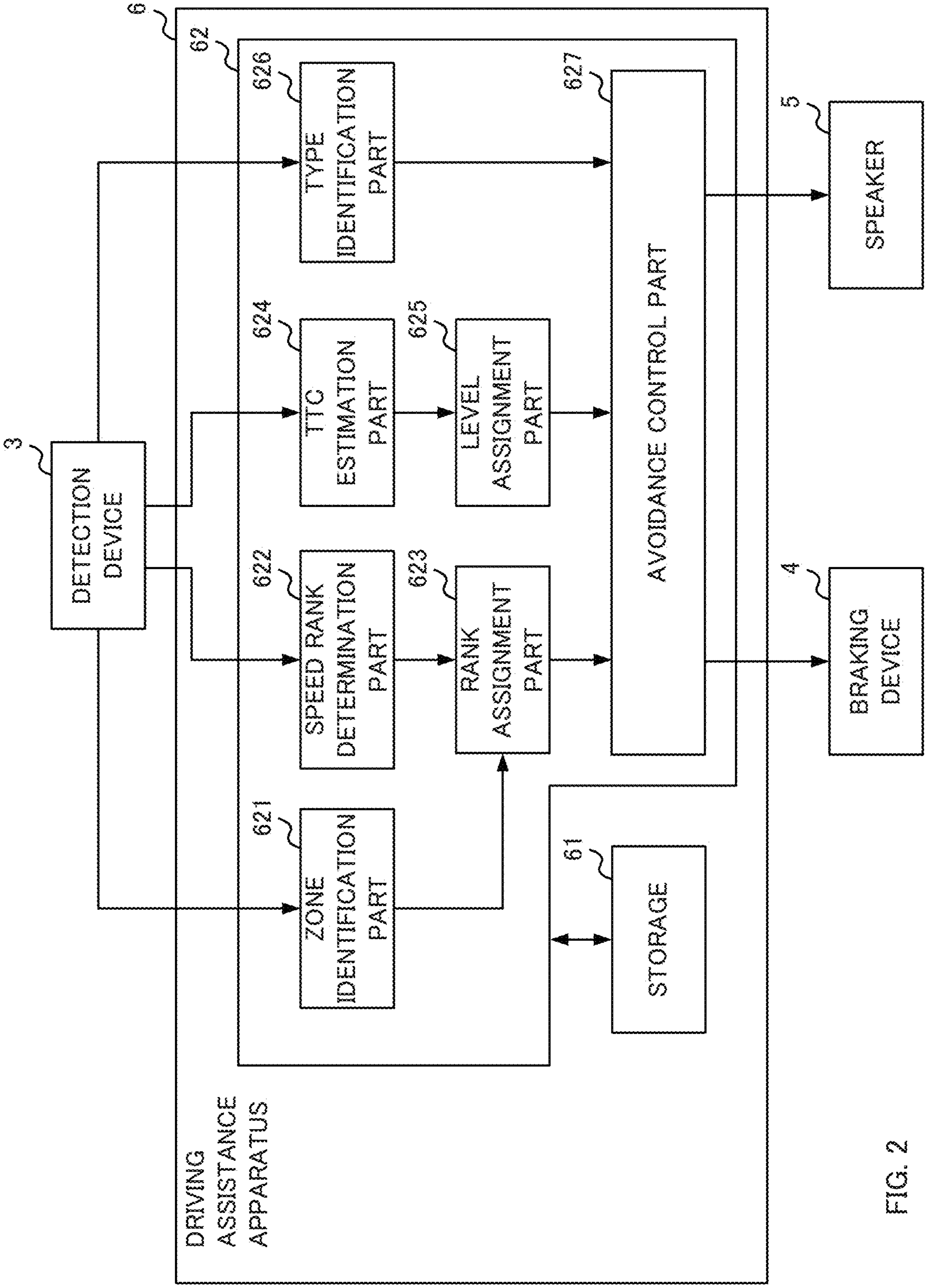
FIG. 2 illustrates a configuration of the driving assistance apparatus.

A configuration of a driving assistance apparatus 6 mounted on a reversing vehicle 1 will be described with reference to FIGS. 1 and 2. FIG. 1 illustrates an overview of a driving assistance apparatus 6. FIG. 2 illustrates a configuration of the driving assistance apparatus 6.

A reversing vehicle 1 is a vehicle that is reversing. The reversing vehicle 1 is a truck, for example, but may be a passenger car. The reversing vehicle 1 has a detection device 3, a braking device 4, a speaker 5, and a driving assistance apparatus 6 mounted thereon. A moving object 21, a moving object 22, and a moving object 23 are objects present around the reversing vehicle 1. In the following description, the moving object 21, the moving object 22, and the moving object 23 are referred to as moving objects 2 if they do not need to be distinguished from each other. The moving object 2 is another vehicle (a motorcycle or a passenger car), a pedestrian, or a bicycle, for example, but is not limited thereto. It should be noted that the moving object 2 is a passenger car in the present embodiment.

The detection device 3 detects the moving object 2 around the reversing vehicle 1. For example, the detection device 3 detects a relative position, a relative distance, and a relative speed of the moving object 2 with respect to the reversing vehicle 1 by analyzing a captured image of an area behind the reversing vehicle 1 in its direction of travel. The detection device 3 may detect the relative position and the relative speed of the moving object 2 with respect to the reversing vehicle 1 by analyzing scanning data of a Laser Imaging Detection and Ranging (LIDAR) that scans the area behind the reversing vehicle 1 in its direction of travel, or may detect the relative position and the relative speed of the moving object 2 with respect to the reversing vehicle 1 using other methods. Further, the detection device 3 may detect the type of the moving object 2 by analyzing a captured image or scanning data. Specifically, the detection device 3 detects whether the moving object 2 is a pedestrian or a light vehicle such as a bicycle, or whether the moving object 2 is a vehicle.

The braking device 4 is a brake for decelerating the reversing vehicle 1. For example, the braking device 4 is at least one of a drum brake or an auxiliary brake. The drum brake achieves a braking force by pressing a brake shoe against a drum rotating together with a wheel of the reversing vehicle 1. The auxiliary brake is at least any of i) a retarder that achieves a braking force by directly applying a load to an output shaft of an engine of the reversing vehicle 1 or ii) an exhaust brake that enhances an effect of engine braking by utilizing rotational resistance of the engine.

The speaker 5 is a device that outputs sound. The speaker 5 is controlled by the driving assistance apparatus 6 to output sound. It should be noted that the speaker 5 may be a buzzer that outputs a beeping sound or an alert tone.

The driving assistance apparatus 6 assists driving of a driver of the reversing vehicle 1. For example, the driving assistance apparatus 6 causes the reversing vehicle 1 to execute avoidance control for avoiding a collision between the reversing vehicle 1 and the moving object 2. Specifically, the driving assistance apparatus 6 causes the reversing vehicle 1 to execute the avoidance control if the moving object 2 is approaching the estimated path 11 that the reversing vehicle is estimated to pass through. The driving assistance apparatus 6 estimates the estimated path 11. The driving assistance apparatus 6 estimates the estimated path 11 on the basis of an angle and angular velocity of a steering wheel of the reversing vehicle 1 and speed and acceleration of the reversing vehicle 1. It should be noted that a known technique can be used as a method for estimating the estimated path 11.

A plurality of zones are set along the estimated path 11. The plurality of zones are, in descending order of proximity to the reversing vehicle 1, a first zone 12A, a second zone 12B, and a third zone 12C. Risk ranks are assigned to the first zone 12A, the second zone 12B, and the third zone 12C in descending order of proximity to the reversing vehicle 1. Specifically, a highest risk rank [A] is assigned to the first zone 12A, which is closest to the reversing vehicle 1. A lowest risk rank [C] is assigned to the third zone 12C, which is farthest to the reversing vehicle 1. A risk rank [B] between the highest risk rank [A] and the lowest risk rank [C] is assigned to the second zone 12B.

The driving assistance apparatus 6 causes the reversing vehicle 1 to execute the avoidance control that enables avoidance of the collision between the reversing vehicle 1 and the moving object 2, in accordance with an entry zone that the moving object 2 enters among the plurality of zones along the estimated path 11. Thus, the reversing vehicle 1 can avoid the collision between the reversing vehicle 1 and the moving object 2. A specific configuration of the driving assistance apparatus 6 will be described below.

The driving assistance apparatus 6 includes a storage 61 and a controller 62. The storage 61 is a storage medium including a Read Only Memory (ROM), a Random Access Memory (RAM), a hard disk, and the like. The storage 61 stores a program executed by the controller 62.

The controller 62 is a calculation resource including a processor such as a Central Processing Unit (CPU). The controller 62 implements functions as a zone identification part 621, a speed rank determination part 612, a rank assignment part 623, a TTC estimation part 624, a level assignment part 625, a type identification part 626, and an avoidance control part 627 by executing the program stored in the storage 61.

The zone identification part 621 identifies an entry zone that the moving object 2 enters from among a plurality of zones along the estimated path 11. The zone identification part 621 identifies an entry zone for the moving object 2 present within a detectable range of the detection device 3. Specifically, the zone identification part 621 identifies the entry zone for at least any of i) a moving object 2 present within a detection range of the LIDAR or ii) a moving object 2 present within a range that can be captured by an imaging device that captures the area behind the reversing vehicle 1. A detailed process of the zone identification part 621 for identifying the entry zone will be described below.

First, the zone identification part 621 estimates an estimated path that each moving object 2 is estimated to pass through. For example, the zone identification part 621 estimates the estimated path of each moving object 2 on the basis of the relative position, the relative distance, and the relative speed of each moving object 2 acquired from the detection device 3. It should be noted that the zone identification part 621 may estimate the path using other methods. Subsequently, the zone identification part 621 estimates an estimated path 211 of the moving object 21, an estimated path 221 of the moving object 22, and an estimated path 231 of the moving object 23. The zone identification part 621 then identifies, from among the plurality of zones, a zone in which the estimated path of the moving object 2 is included as the entry zone. As a specific example, the zone identification part 621 identifies the first zone 12A as the entry zone for the moving object 21 because the estimated path 211 of the moving object 21 is included in the first zone 12A. The zone identification part 621 identifies an entry zone for each moving object 2 that is estimated to enter the estimated path, from among a plurality of moving objects 2. It should be noted that the zone identification part 621 may identify a zone where the estimated path 11 of the reversing vehicle 1 and the estimated path of each moving object 2 intersect with each other as the entry zone.

The speed rank determination part 622 determines a speed rank according to the speed of the moving object 2 for which the entry zone has been identified. First, the speed rank determination part 622 estimates the speed of each moving object 2. For example, the speed rank determination part 622 estimates the speed of the moving object 2 on the basis of i) the speed of the reversing vehicle 1 and ii) the relative speed of the moving object 2 with respect to the reversing vehicle 1. The speed rank determination part 622 may estimate the speed of the moving object 2 using other methods.

Subsequently, the speed rank determination part 622 determines, as the speed rank of the moving object 2 whose speed has been estimated, a speed rank corresponding to the estimated speed of the moving object 2 from among a plurality of predefined speed ranks. The plurality of speed ranks are respectively associated with a plurality of speed ranges. The plurality of speed ranges include i) a first speed range of greater than 15 km/h, ii) a second speed range of greater than 10 km/h and less than or equal to 15 km/h, and iii) a third speed range of 10 km/h or less, for example. The first speed range is associated with [speed rank 1]. The second speed range is associated with [speed rank 2]. The third speed range is associated with [speed rank 3].

The speed rank determination part 622 then determines a speed rank corresponding to a speed range that includes the estimated speed of the moving object 2 as the speed rank of that moving object 2. If the speed of the moving object 2 is included in the first speed range, the speed rank determination part 622 determines [speed rank 1] as the speed rank of the moving object 2. If the speed of the moving object 2 is included in the second speed range, the speed rank determination part 622 determines [speed rank 2] as the speed rank of the moving object 2. If the speed of the moving object 2 is included in the third speed range, the speed rank determination part 622 determines [speed rank 3] as the speed rank of the moving object 2. As a specific example, the speed rank determination part 622 determines [speed rank 1] as the speed rank of the moving object 2 traveling at a speed of 20 km/h.

The rank assignment part 623 assigns, to the moving object 2 for which the entry zone has been identified and whose speed rank has been determined, a risk rank indicating a risk of a collision between said moving object 2 and the reversing vehicle 1. For example, the rank assignment part 623 assigns, to the moving object 2, the risk rank corresponding to the entry zone and the speed rank. Specifically, the rank assignment part 623 assigns, to the moving object 2, the risk rank corresponding to the entry zone and the speed rank of the moving object 2 by referring to rank assignment information. The rank assignment information is a data table in which each of the plurality of entry zones and each of the plurality of speed ranks are associated with each other, for example. FIG. 3 is a data table showing an example of the rank assignment information. The rank assignment information is stored in the storage 61, for example. As a specific example, the rank assignment part 623 assigns a risk rank [A-1] to a moving object 21 that is estimated to enter the first zone 12A and to which [speed rank 1] has been assigned.

The Time to Collision (TTC) estimation part 624 estimates an intersection position CP of the estimated path of the moving object 2 and the estimated path of the reversing vehicle 1. The TTC estimation part 624 estimates a time until collision between the moving object 2 and the reversing vehicle 1 for which the intersection position CP has been estimated. For example, the TTC estimation part 624 estimates the time until collision on the basis of i) a distance between the estimated intersection position CP and the position of the reversing vehicle 1 and ii) the speed of the reversing vehicle 1. Specifically, the TTC estimation part 624 estimates, as the time until collision, a time required for the reversing vehicle 1 to travel a distance along the estimated path 11 of the reversing vehicle 1 from the position of the reversing vehicle 1 to the intersection position CP while the reversing vehicle 1 is maintaining its current speed. In other words, the TTC estimation part 624 estimates, as the time until collision, a value equal to the distance along the estimated path 11 of the reversing vehicle 1 from the position of the reversing vehicle 1 to the intersection position CP divided by the current speed of the reversing vehicle 1. A time until the reversing vehicle 1 reaches the estimated intersection position CP is a Time to Collision (TTC) when the reversing vehicle 1 and the moving object 2 continue to move.

The level assignment part 625 assigns a TTC level corresponding to the time until collision estimated by the TTC estimation part 624 to the TTC level of the moving object 2. For example, the level assignment part 625 assigns a TTC level to the TTC level of the moving object 2 by referencing level assignment information in which i) each of a plurality of ranges of the time until collision and ii) the TTC level corresponding to each of those ranges are associated with each other. The level assignment information is stored in the storage 61. FIG. 4 is a data table showing an example of the level assignment information.

As shown in FIG. 4, the plurality of ranges of the time until collision include, but are not limited to, five ranges of time. A first time range is 0.0 seconds or more and less than 0.3 seconds. A second time range is 0.3 seconds or more and less than 0.5 seconds. A third time range is 0.5 seconds or more and less than 1.0 seconds. A fourth time range is 1.0 second or more and less than 1.5 seconds. A fifth time range is 1.5 seconds or more. Each range is associated with a risk level, where a lower minimum value of the range corresponds to a higher risk level. The first time range having the lowest minimum value of the range is associated with [Level 1] representing the highest risk level, and the fifth range having the highest minimum value of the range is associated with [Level 5] representing the lowest risk level.

The level assignment part 625 assigns, to the TTC level of the moving object 2, a TTC level associated with a range of the time until collision containing the time until collision that has been estimated by the TTC estimation part 624. As a specific example, the level assignment part 625 assigns [Level 1] to the TTC level of the moving object 21 if the time until collision between the moving object 21 and the reversing vehicle 1 is 0.2 seconds.

The type identification part 626 identifies the type of the moving object 2 to which the risk rank has been assigned. For example, the type identification part 626 identifies whether the moving object 2 is a vehicle or a pedestrian. Specifically, the type identification part 626 identifies whether the moving object 2 is a pedestrian, a light vehicle such as a bicycle, or a vehicle by analyzing at least any of a captured image or scanning data from the detection device 3. It should be noted that the type identification part 626 may acquire information indicating the type of the moving object 2 from the detection device 3. In this case, the type identification part 626 acquires information indicating whether the moving object 2 is a pedestrian or a vehicle. Further, the type identification part 626 identifies the type of each of the plurality of moving objects 2 to which the risk rank has been assigned.

The avoidance control part 627 causes the reversing vehicle 1 to execute avoidance control that enables the avoidance of the collision between the reversing vehicle 1 and the moving object 2. For example, the avoidance control part 627 causes the reversing vehicle 1 to execute the avoidance control that enables the avoidance of the collision between the reversing vehicle 1 and the moving object 2 to which the risk rank and the TTC level has been assigned. Specifically, the avoidance control part 627 causes the reversing vehicle 1 to execute the avoidance control associated with the assigned risk rank. More specifically, the avoidance control part 627 causes the reversing vehicle 1 to execute the avoidance control associated with the risk rank assigned to the moving object 2 by referring to control information in which each of a plurality of risk ranks and avoidance control corresponding to each risk rank are associated with each other. The control information is stored in the storage 61. FIG. 5 is a data table showing an example of the control information.

As illustrated in FIG. 5, each of the plurality of risk ranks and a plurality of avoidance controls are associated with the control information. Specifically, the control information is associated with i) each of the plurality of risk ranks, ii) a plurality of TTC levels corresponding to the time until collision, and iii) a plurality of avoidance controls. More specifically, the control information is associated with one or more avoidance controls corresponding both to each of the risk ranks and each of the TTC levels. Further, each of the avoidance controls is associated with the priority of each of the risk ranks.

The plurality of avoidance controls include braking control, alert control, and warning control. The braking control is control for causing the braking device 4 of the reversing vehicle 1 to generate a braking force that enables the avoidance of the collision between the reversing vehicle 1 and the moving object 2. In other words, the braking control is control for causing the braking device 4 to generate braking force that results in deceleration to stop the reversing vehicle 1 before the time until collision elapses. The braking control is assigned with the highest priority (3).

The alert control is control for outputting an alert sound to notify that the moving object 2 is approaching the reversing vehicle 1. The alert control is control for causing the speaker 5 to output a relatively small sound, for example. As a specific example, the alert control is control for causing the speaker 5 to output a long "beep" sound. The alert control is assigned with the lowest priority (1).

The warning control is control for outputting a warning sound to notify of an impending collision between the reversing vehicle 1 and the moving object 2. The warning control is, for example, control for causing the speaker 5 to output a sound louder than that in the alert control and whose output interval becomes shorter as the distance between the reversing vehicle 1 and the moving object 2 decreases. Specifically, the warning control shortens the interval between the output of each short "beep" sound as the distance between the reversing vehicle 1 and the moving object 2 decreases. The warning control is assigned with a priority (2) between the highest priority (3) and the lowest priority (1).

Some of the plurality of avoidance controls are associated with the type of the moving object 2. In other words, the control information is associated with the plurality of avoidance controls associated with the risk rank and the TTC level. One of the plurality of avoidance controls is executed according to whether the type of moving object 2 is a vehicle or a pedestrian. In other words, the risk rank and the TTC level are associated with i) the plurality of types of moving object 2 and ii) the avoidance controls to be executed according to the type of moving object 2. As a specific example, the risk rank [A-3] and the TTC level [Level 3] are associated with i) the [braking control (3)] as the avoidance control for the type (pedestrian) of the moving object 2 and ii) the [warning control (2)] as the avoidance control for the type (vehicle) of the moving object 2.

The avoidance control part 627 executes the avoidance control associated with the risk rank and the TTC level of the moving object 2. In other words, the avoidance control part 627 causes the reversing vehicle 1 to execute the avoidance control associated with the risk rank and the TTC level of the moving object 2 by controlling at least any of the braking device 4 or the speaker 5 of the reversing vehicle 1. As a specific example, if the risk rank [A-1] and the TTC level [Level 1] are assigned to the moving object 21, the avoidance control part 627 causes the braking device 4 to exert the braking force, thereby causing the reversing vehicle 1 to execute the [braking control (3)] associated with the risk rank [A-1] and the TTC level [Level 1]. In addition, as another example, if the risk rank [C-2] and the TTC level [Level 3] are assigned to the moving object 23, the avoidance control part 627 causes the speaker 5 to output the alert sound, thereby causing the reversing vehicle 1 to execute the [alert control (1)] associated with the risk rank [C-2] and the TTC level [Level 3]. In this way, the avoidance control part 627 can cause the reversing vehicle 1 to execute appropriate avoidance control, which is in accordance with the risk of the moving object 2 or the time until collision, with respect to the moving object 2 that may collide with the reversing vehicle 1.

If a plurality of moving objects 2 are estimated to enter the zone, the avoidance control part 627 causes the reversing vehicle 1 to execute whichever avoidance control has a higher priority than other avoidance controls. For example, the avoidance control part 627 causes the reversing vehicle 1 to execute the avoidance control having the highest priority among the plurality of avoidance controls, each of which are associated with the risk rank of the entry zone of each moving object 2. Specifically, the avoidance control part 627 first identifies the avoidance control associated with the risk rank and the TTC level of each moving object 2 by referring to the control information. The avoidance control part 627 then causes the reversing vehicle 1 to execute the avoidance control having the highest priority among the plurality of identified avoidance controls. For example, if the [braking control (3)] and the [alert control (1)] are identified, the avoidance control part 627 causes the braking device 4 to exert the braking force, thereby causing the reversing vehicle 1 to execute the [braking control (3)], which has the highest priority. Accordingly, the avoidance control part 627 can cause the reversing vehicle 1 to execute the avoidance control corresponding to the moving object 2 that poses a greater danger in the event of a collision. It should be noted that the avoidance control part 627 may cause the speaker 5 to output the alert sound to execute the [alert control (1)] simultaneously with the [braking control (3)].

The avoidance control part 627 causes the reversing vehicle 1 to execute the avoidance control according to the priority associated with the type of the moving object 2. For example, the avoidance control part 627 causes the reversing vehicle 1 to execute the avoidance control having the highest priority among the priorities of the avoidance controls associated with the risk rank, the TTC level, and the type of the moving object 2 by referring to the control information. Specifically, if the moving object 2 is a pedestrian, the avoidance control part 627 causes the reversing vehicle 1 to execute the avoidance control, which has a higher priority than when the moving object 2 is a vehicle.

As a specific example, if the moving object 2 to which the risk rank [A-3] and the TTC level [Level 3] are assigned is a vehicle, the avoidance control part 627 causes the reversing vehicle 1 to execute the [warning control (2)], which is associated with the risk rank assigned to the moving object 2 and the type of the moving object 2 (vehicle) (see FIG. 5). Further, if the moving object 2 to which the risk rank [A-3] and the TTC level [Level 3] are assigned is a pedestrian, the avoidance control part 627 causes the reversing vehicle 1 to execute the [braking control (3)], which is associated with the risk rank assigned to the moving object 2 and the type of the moving object 2 (pedestrian) and whose priority is higher than that of the [warning control (2)] associated with the (vehicle). In this manner, the avoidance control part 627 can improve the safety for a pedestrian, who is more likely to sustain greater damage in a collision than a vehicle. It should be noted that the avoidance control part 627 may cause the reversing vehicle 1 to execute the avoidance control associated with the type of the moving object 2 (pedestrian) even if the moving object 2 is a light vehicle such as a bicycle.

Collision Avoidance Process

Figure 6:
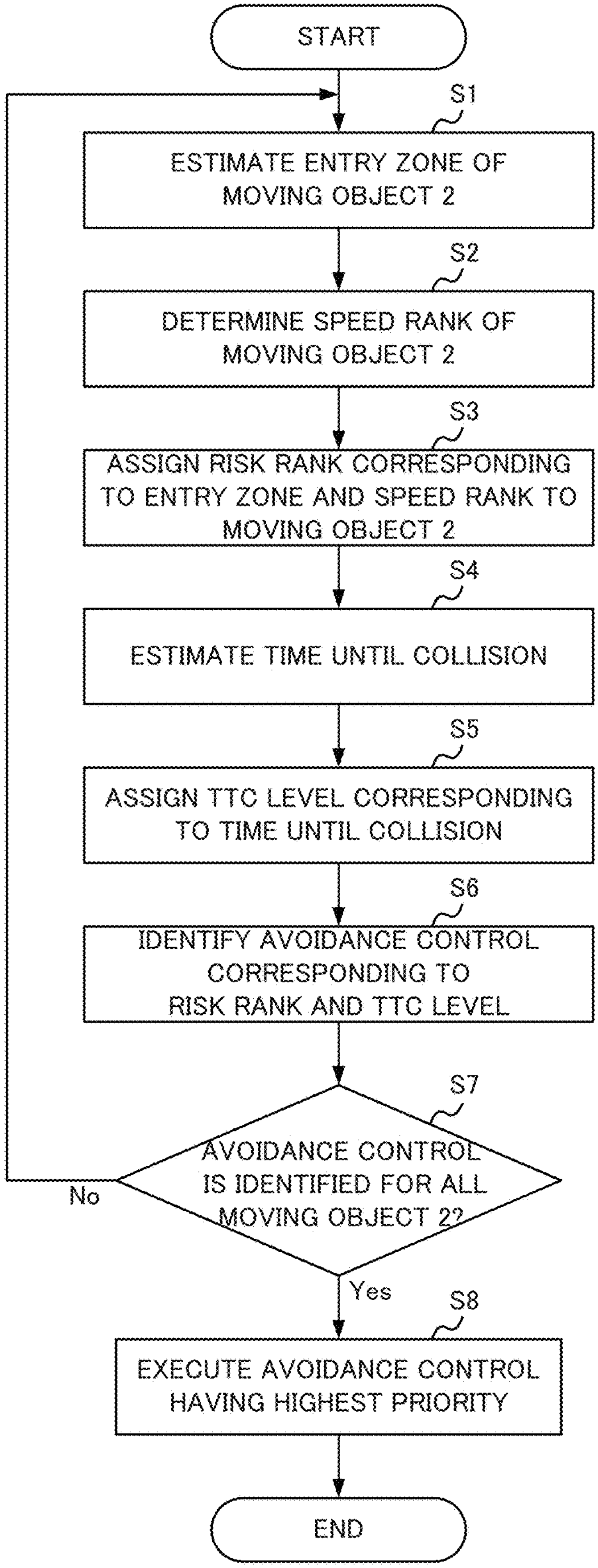
FIG. 6 is a flowchart illustrating an example of a collision avoidance process.

FIG. 6 is a flowchart illustrating an example of a collision avoidance process. The process of avoiding the collision between the reversing vehicle 1 and the moving object 2 is executed when the reversing vehicle 1 starts reversing.

The zone identification part 621 identifies the entry zone of the moving object 2 around the reversing vehicle 1 (step S1). Specifically, the zone identification part 621 identifies the entry zone in which the estimated path of the moving object 2 is included from among the plurality of zones set along the estimated path 11 of the reversing vehicle 1. The speed rank determination part 622 determines the speed rank of the moving object 2 (step S2). Specifically, the speed rank determination part 622 i) estimates the speed of the moving object 2 determined on the basis of the speed of the reversing vehicle 1 and the relative speed of the moving object 2 with respect to the reversing vehicle 1, and ii) determines the speed rank according to the estimated speed.

The rank assignment part 623 assigns the risk rank corresponding to the entry zone and the speed rank to the moving object 2 (step S3). Specifically, the rank assignment part 623 refers to the rank assignment information (see FIG. 3), and assigns the risk rank, associated with the identified entry zone and the assigned speed rank, to the moving object 2.

The TTC estimation part 624 estimates the time until collision between the moving object 2 for which the entry zone and speed have been estimated and the reversing vehicle 1 (step S4). Specifically, the TTC estimation part 624 estimates, as the time until collision, a time required for the reversing vehicle 1 to travel a distance along the estimated path 11 from the position of the reversing vehicle 1 to the intersection position CP of the estimated path of the moving object 2 and the estimated path of the reversing vehicle 1.

The level assignment part 625 assigns the TTC level corresponding to the estimated time until collision (step S5). Specifically, the level assignment part 625 assigns the TTC level associated with the range including the time until collision to the moving object 2 by referring to the level assignment information (see FIG. 4).

The avoidance control part 627 identifies the avoidance control corresponding to the risk rank and the TTC level (step S6). Specifically, the avoidance control part 627 identifies the avoidance control associated with the risk rank and the TTC level by referring to the control information (see FIG. 5).

The avoidance control part 627 determines whether or not the avoidance control has been identified for all the moving objects 2 to which the risk ranks and the TTC levels were assigned (step S7). If there is a moving object 2 for which the avoidance control has not been identified (NO in step S7), the avoidance control part 627 repeats steps S1 to S6 until the avoidance control is identified for all the moving objects 2 to which the risk ranks and the TTC levels were assigned. It should be noted that the avoidance control part 627 may execute the process of steps S1 to S7 in parallel for each of the plurality of moving objects 2.

If the avoidance control has been identified for all the moving objects 2 to which the risk ranks and the TTC levels were assigned (YES in step S7), the avoidance control part 627 causes the reversing vehicle 1 to execute the avoidance control having the highest priority among the plurality of identified avoidance controls (step S8).

Modification 1

It is considered that there is no risk of a collision between a moving object 2 for which an entry zone is not identified and the reversing vehicle 1. Therefore, the rank assignment part 623 does not assign the risk rank to the moving object 2 for which the entry zone is not identified. In other words, the rank assignment part 623 does not assign the risk rank to a moving object 2 that does not enter any of the plurality of zones. As a specific example, the rank assignment part 623 does not estimate the speed, the type, and the time until collision of a moving object 2 whose estimated path 221 does not pass through any of the plurality of zones. Thus, the driving assistance apparatus 6 does not need to perform a plurality of processes related to assigning the risk rank and identifying the avoidance control for the moving object 22 that does not have a risk of colliding with the reversing vehicle 1, thereby reducing a processing load of the driving assistance apparatus 6.

Modification 2

The storage 61 may store the control information corresponding to each of the plurality of types of the moving object 2. For example, the storage 61 stores vehicle control information corresponding to a vehicle and pedestrian control information corresponding to a pedestrian. In this case, the avoidance control part 627 identifies the avoidance control associated with the risk rank of the moving object 2 that is a vehicle from the vehicle control information, and identifies the avoidance control associated with the risk rank of the moving object 2 that is a pedestrian from the pedestrian control information.

Effects of Driving Assistance Apparatus 6

As described above, the driving assistance apparatus 6 identifies the entry zone that the moving object 2 around the reversing vehicle 1 enters from among the plurality of zones, to which higher risk ranks are assigned in descending order of proximity to the reversing vehicle 1, along the estimated path 11 of the reversing vehicle 1. Then, the driving assistance apparatus 6 i) refers to the control information in which the plurality of risk ranks and the avoidance control, corresponding to each risk rank and enabling the avoidance of the collision between the reversing vehicle 1 and the moving object 2, are associated with each other, and ii) causes the reversing vehicle 1 to execute the avoidance control which is associated with the risk rank of the entry zone of the moving object 2.

Accordingly, the driving assistance apparatus 6 causes the reversing vehicle 1 to execute i) the avoidance control associated with the higher risk rank if the moving object 2 enters the zone close to the reversing vehicle 1, and ii) the avoidance control associated with the lower risk rank if the moving object 2 enters the zone far from the reversing vehicle 1, for example. In this way, the driving assistance apparatus 6 can cause the reversing vehicle 1 to execute the appropriate avoidance control according to the risk rank of the moving object 2 that may collide with the reversing vehicle 1.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The invention claimed is:

1. A driving assistance apparatus comprising:

a storage that stores control information in which i) each of a plurality of risk ranks indicating a risk of a collision between a reversing vehicle that is reversing and a moving object, ii) each of a plurality of speed ranks according to speed of the moving object, and iii) contents of avoidance control enabling avoidance of a collision between the reversing vehicle and the moving object corresponding to combinations of respective risk ranks and respective speed ranks are associated with each other;

a zone identification part that identifies an entry zone that a moving object present around the reversing vehicle enters from among a plurality of zones set along an estimated path of the reversing vehicle;

a speed rank determination processor that determines a speed rank corresponding to speed of the moving object determined on the basis of i) speed of the reversing vehicle and ii) a relative speed of the moving object with respect to the reversing vehicle; and an avoidance control part that causes the reversing vehicle to execute avoidance control determined by a risk rank corresponding to the identified entry zone and the determined speed rank, by referring to the control information.

2. The driving assistance apparatus according to claim 1, wherein the plurality of the zones are assigned with the risk ranks being higher as a distance between the zone and the reversing vehicle is shorter, and the avoidance control part causes the reversing vehicle to execute the avoidance control determined by the risk rank assigned to the zone identified as the entry zone from among the plurality of the zones, by referring to the control information.

3. The driving assistance apparatus according to claim 1, comprising:

a TTC estimation processor that estimates a time until collision between the reversing vehicle and the moving object, wherein the storage that stores the control information in which i) each of the plurality of risk ranks, ii) each of a plurality of speed ranks according to speed of the moving object, iii) each of a plurality of levels according to the time until collision, and iv) the avoidance control are associated with each other, the TTC estimation processor estimates, as the time until collision, a time determined on the basis of i) a distance between an intersection position where an estimated path of the reversing vehicle and an estimated path of the moving object intersect each other and a position of the reversing vehicle and ii) speed of the reversing vehicle, and the avoidance control part causes the reversing vehicle to execute avoidance control determined by a level corresponding to the risk rank of the entry zone, the speed rank, and the estimated time until collision.

4. The driving assistance apparatus according to claim 1, wherein the speed rank is associated with each of a plurality of speed ranges, and the speed rank determination processor determines a speed rank associated with the speed range including speed of the moving object as a speed rank of the moving object.

5. The driving assistance apparatus according to claim 1, wherein the zone identification part identifies a zone in which an estimated path of the moving object is included from among the plurality of zones as the entry zone of the moving object, and the speed rank determination processor determines the speed rank of a moving object for which the entry zone has been identified, and does not determine the speed rank of a moving object for which the entry area has not been identified.

6. The driving assistance apparatus according to claim 1, wherein a priority is assigned to each of the plurality of avoidance controls of the control information, the zone identification part identifies an entry zone that each of a plurality of the moving objects around the reversing vehicle enters, and the avoidance control part causes the reversing vehicle to execute avoidance control having the highest priority among a plurality of the avoidance controls determined by a risk rank of the entry zone of each moving object.

7. The driving assistance apparatus according to claim 6, wherein the plurality of avoidance controls include:

braking control that is control for generating braking force to the reversing vehicle enabling avoidance of a collision between the reversing vehicle and the moving object, and that has a highest priority, alert control that is control for outputting an alert sound notifying that the moving object is approaching the reversing vehicle, and that has a lowest priority, and warning control that is control for outputting a warning sound for notifying of an impending collision between the reversing vehicle and the moving object, and that has a priority between the highest priority and the lowest priority.

8. The driving assistance apparatus according to claim 1, comprising:

a type identification processor that identifies a type of the moving object, wherein the avoidance control part causes the reversing vehicle to execute the avoidance control associated with a risk rank of the entry zone and a type of the moving object, by referring to the control information in which a type of the moving object is associated with the avoidance control.

9. The driving assistance apparatus according to claim 8, wherein the risk rank is associated with i) a vehicle and a pedestrian as a type of the moving object and ii) avoidance control corresponding to the vehicle and avoidance control corresponding to the pedestrian, the type identification processor identifies whether a type of the moving object is a vehicle or a pedestrian, and the avoidance control part causes the reversing vehicle to execute:

avoidance control determined by an identified risk rank of the entry zone and the vehicle if a type of the moving object is identified to be a vehicle, and avoidance control determined by an identified risk rank of the entry zone and the pedestrian if a type of the moving object is identified to be a pedestrian.

10. A driving assistance method executed by a processor mounted on a reversing vehicle that is reversing, the method comprising the steps of:

identifying an entry zone that a moving object enters from among a plurality of zones set along an estimated path of the reversing vehicle;

determining a speed rank corresponding to speed of the moving object determined on the basis of i) speed of the reversing vehicle and ii) a relative speed of the moving object with respect to the reversing vehicle; and causing the reversing vehicle to execute avoidance control determined by a risk rank corresponding to the identified entry zone and the determined speed rank, by referring to control information in which i) each of a plurality of risk ranks indicating a risk of a collision between the reversing vehicle and a moving object, ii) each of a plurality of speed ranks according to speed of the moving object, and iii) contents of avoidance control enabling avoidance of a collision between the reversing vehicle and the moving object corresponding to combinations of respective risk ranks and respective speed ranks are associated with each other.

11. A non-transitory storage medium storing a program for causing a processor mounted on a reversing vehicle that is reversing to function as:

an identification part that identifies an entry zone that a moving object enters from among a plurality of zones set along an estimated path of the reversing vehicle;

a speed rank determination processor that determines a speed rank corresponding to speed of the moving object determined on the basis of i) speed of the reversing vehicle and ii) a relative speed of the moving object with respect to the reversing vehicle; and an avoidance control part that causes the reversing vehicle to execute avoidance control determined by a risk rank corresponding to the identified entry zone and the determined speed rank, by referring to control information in which i) each of a plurality of risk ranks indicating a risk of a collision between the reversing vehicle and a moving object, ii) each of a plurality of speed ranks according to speed of the moving object, and iii) contents of avoidance control enabling avoidance of a collision between the reversing vehicle and the moving object corresponding to combinations of respective risk ranks and respective speed ranks are associated with each other.

* * * * *